Jan. 7, 1947.  S. BRAND  2,413,859
MULTIPLYING MECHANISM
Filed July 9, 1945  8 Sheets-Sheet 1

INVENTOR.
SAMUEL BRAND
BY

INVENTOR.
SAMUEL BRAND
BY
ATTORNEY.

Jan. 7, 1947. S. BRAND 2,413,859
MULTIPLYING MECHANISM
Filed July 9, 1945 8 Sheets-Sheet 3

INVENTOR.
SAMUEL BRAND
BY
ATTORNEY.

Jan. 7, 1947.　　　　　S. BRAND　　　　　2,413,859
MULTIPLYING MECHANISM
Filed July 9, 1945　　　　　8 Sheets-Sheet 4

INVENTOR
SAMUEL BRAND
BY
ATTORNEY

Jan. 7, 1947.  S. BRAND  2,413,859
MULTIPLYING MECHANISM
Filed July 9, 1945  8 Sheets-Sheet 7

FIG. 13.

INVENTOR.
SAMUEL BRAND
BY
ATTORNEY.

Jan. 7, 1947.     S. BRAND     2,413,859
MULTIPLYING MECHANISM
Filed July 9, 1945          8 Sheets-Sheet 8

INVENTOR.
SAMUEL BRAND
BY
ATTORNEY.

Patented Jan. 7, 1947

2,413,859

UNITED STATES PATENT OFFICE 2,413,859

MULTIPLYING MECHANISM

Samuel Brand, Binghamton, N. Y., assignor to International Business Machines Corporation, New York, N. Y., a corporation of New York Application July 9, 1945, Serial No. 603,798

7 Claims. (Cl. 235—61)

This invention relates to calculating machines and more particularly to machines in which multiplying operations are performed.

The principal object of the invention is to provide improved mechanism for carrying out multiplication. The machine is provided with devices for creating the so-called "partial products," and it is a specific object of the invention to provide improved mechanism for more expeditiously selecting partial products in succession.

A further object of the invention is to provide an improved column shift device coordinated with the partial product mechanism for controlling the entry of the partial products into proper denominational orders of a totalizer.

Other objects of the invention will be pointed out in the following description and claims and illustrated in the accompanying drawings, which disclose, by way of example, the principle of the invention and the best mode, which has been contemplated, of applying that principle.

*Factor entry receiving devices*

Figure 13:
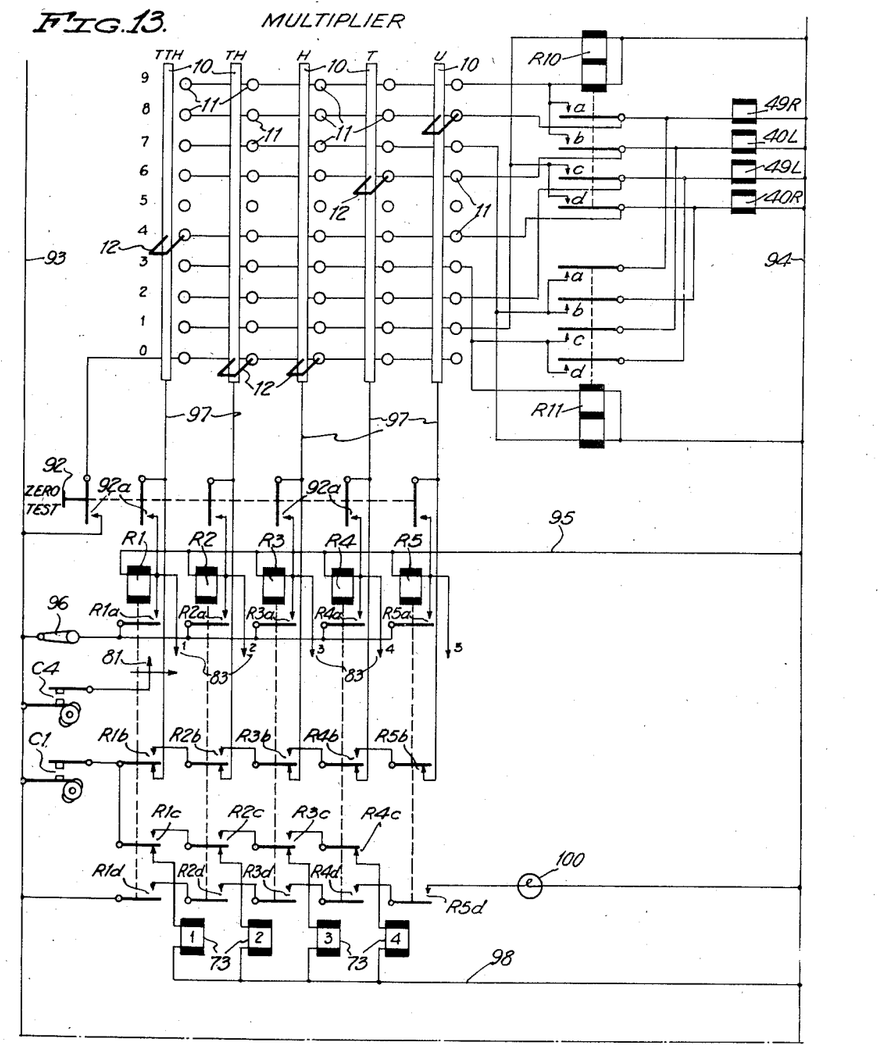
Figs. 13 and 13a taken together with Fig. 13 placed above Fig. 13a constitute a wiring diagram of the electric circuits.

Referring to Fig. 13, there is shown in diagrammatic manner a so-called readout device upon which a five-place multiplier amount may be set. This device comprises five denominationally ordered contact bars 10 alongside of each of which is a row of contact segments 11 having digital values as indicated. Positionable in each order is a brush 12 settable to electrically connect the common bar 10 of the related order with the digital segment 11 corresponding to the digital value represented in the order. Thus, in Fig. 13 the several brush settings represent the value 40068. This receiving device is shown diagrammatically inasmuch as the particular mechanism for effecting a setting is not part of the present invention, and it may therefore be assumed that an amount is set up manually by sliding brushes 12 to the desired contacting positions.

Figure 13A:
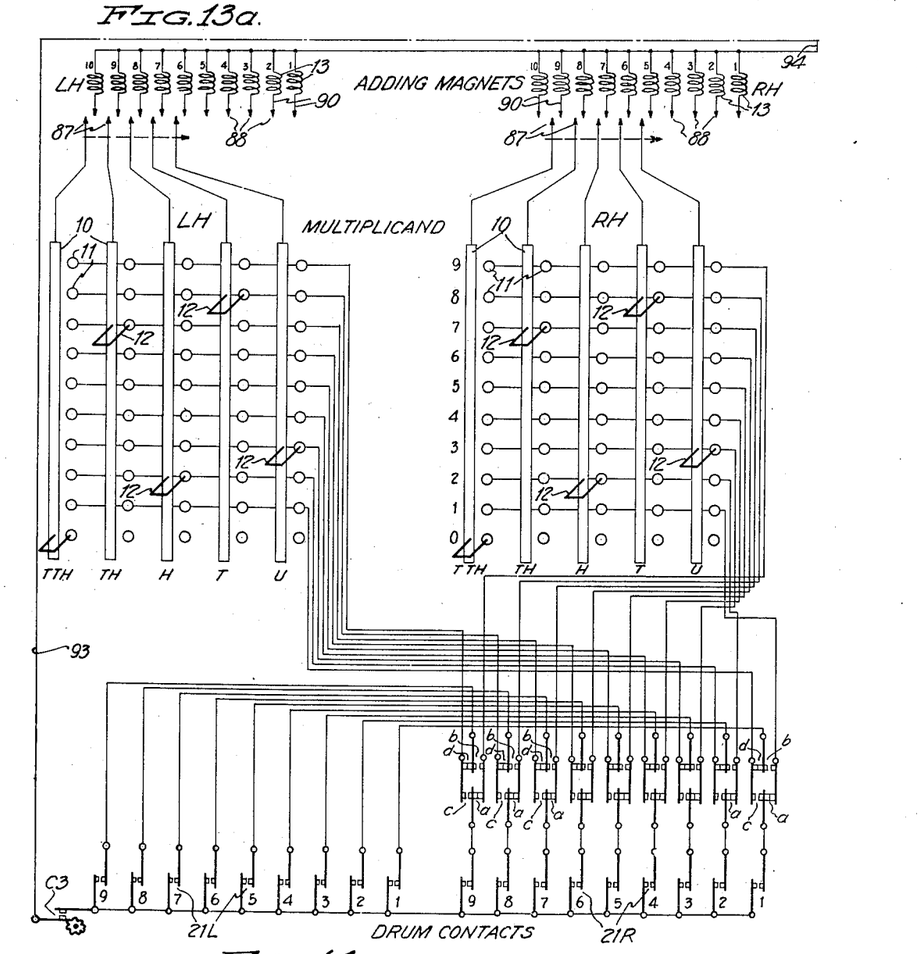

Two exactly similar entry receiving devices are provided to receive a multiplicand entry as shown in Fig. 13a, where one of the devices is designated as LH and the other as RH. A multiplicand amount of 7283 is indicated as being set in both devices. The LH device controls the formation of left hand partial products, and the RH device controls the formation of right hand partial products.

In Fig. 13a, 13 represents the adding magnets of a well known type of totalizer in which differentially timed electrical impulses to the magnets cause entry into the totalizer in accordance with the timing of the impulses. Such a totalizer is shown and described in application Serial No. 433,178, filed March 3, 1942 (now Patent 2,375,275), to which reference may be made for the manner in which the magnets respond to the timed impulses to control the adding of amounts.

The present invention deals with mechanism for obtaining left and right hand partial products concurrently to respectively control the LH and RH sets of magnets 13, so that left and right hand partial products will be totalized separately. The scheme of operation which is well known is graphically indicated in Fig. 14 where vertical columns represent the denominational orders of the LH and RH totalizers. A problem of 40068 times 7283 is represented to show the partial products of 7283 times 4 entered in cycle 1, the partial products of 7283 times 6 entered in cycle 2, the partial products of 7283 times 8 entered in cycle 3. After cycle 13, the sum of the LH and RH partial products stand in the totalizer with the denominational allocation as shown. Thereafter, through devices not shown but well known the two amounts are combined as indicated for cycle 4 by transferring the RH amount into the LH totalizer to obtain the final product.

The multiplying mechanism

Figure 1:
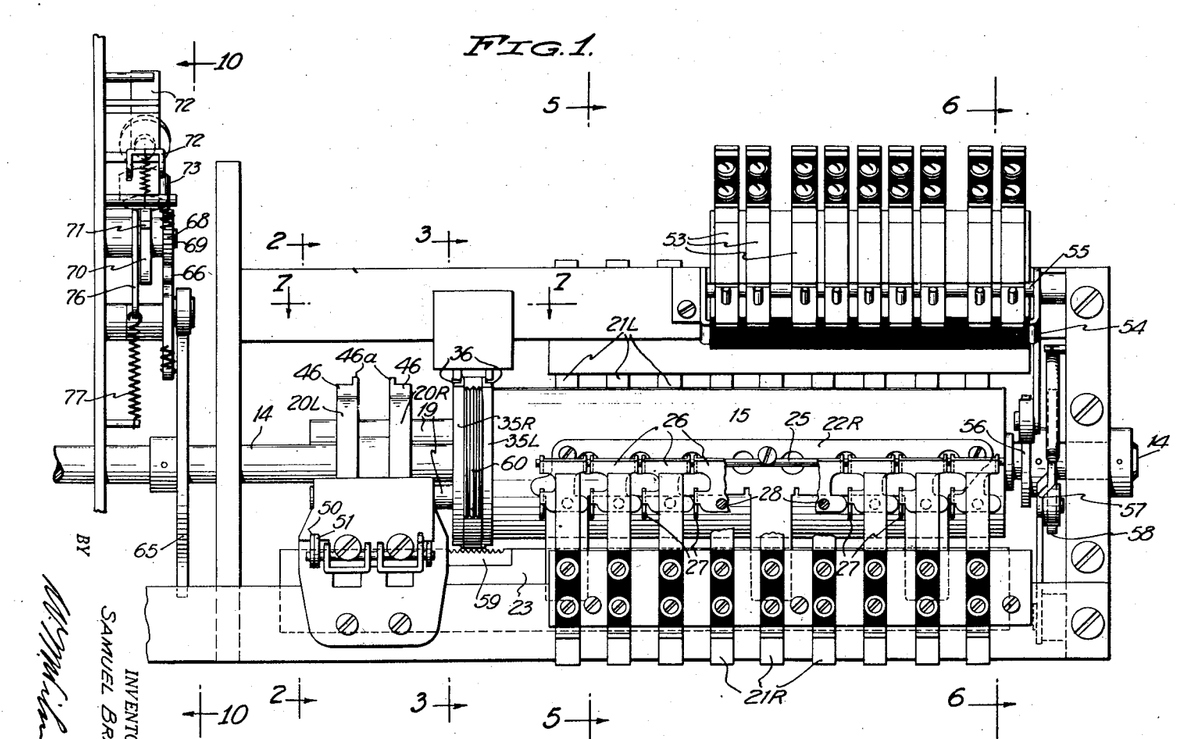
Fig. 1 is an outside elevation of the partial product drum and the selecting mechanism.
Figures 2, 3, 4:
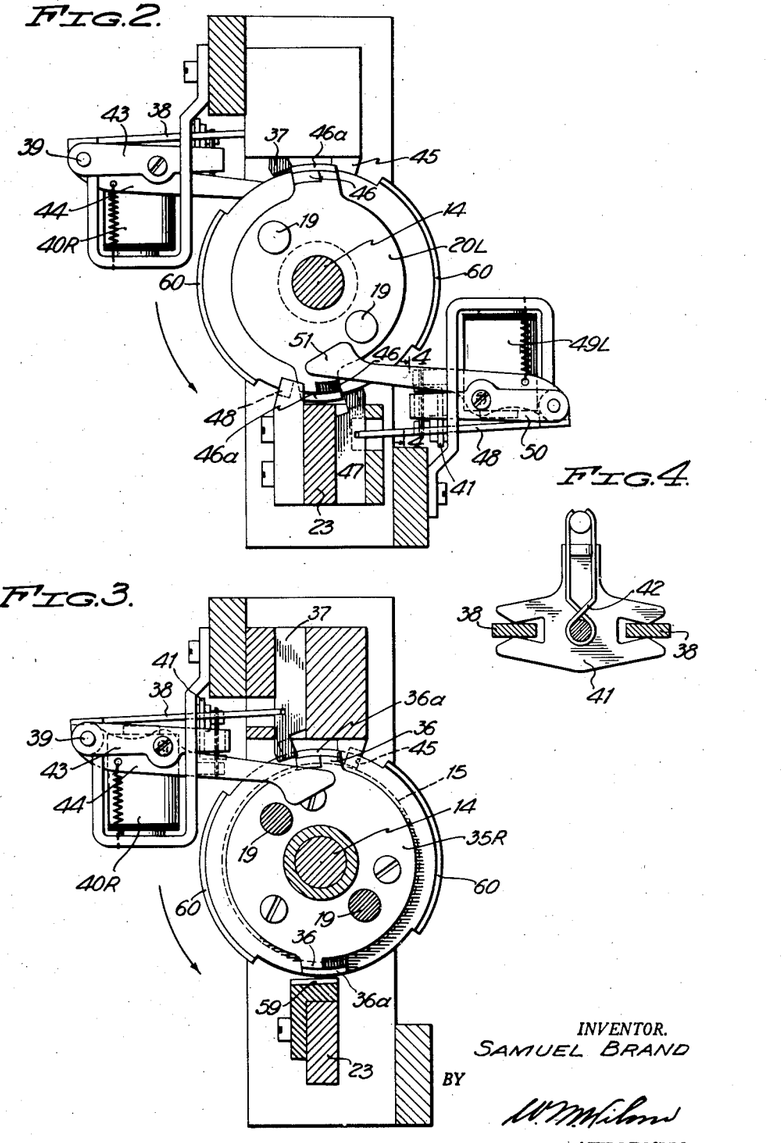
Fig. 2 is a sectional elevation taken on lines 2—2 of Fig. 1 showing the interposer contact shifting mechanism.
Fig. 3 is a sectional elevation taken on lines 3—3 of Fig. 1 showing the drum shifting mechanism.
Fig. 4 is a detail taken on lines 4—4 of Fig. 2.

Referring to Fig. 1, 14 is a shaft which is to be rotated a half revolution for each significant digit in the multiplier amount. For simplification of the disclosure, it will be assumed that after the multiplier and multiplicand have been set up on their respective entry receiving devices, shaft 14 is manually rotated. Slidably mounted on the shaft is a multiplying drum or cylinder generally designated 15 (Fig. 5), in which are openings or perforations 17 arranged in accordance with the multiplication table. One end of the drum has holes therein through which rods 19 extend (Figs. 1 and 2). These rods are affixed in a pair of disks 20L and 20R secured to shaft 14, so that drum 15 rotates with the shaft but is free to slide lengthwise thereon and also slides on rods 19.

Figures 5, 6:
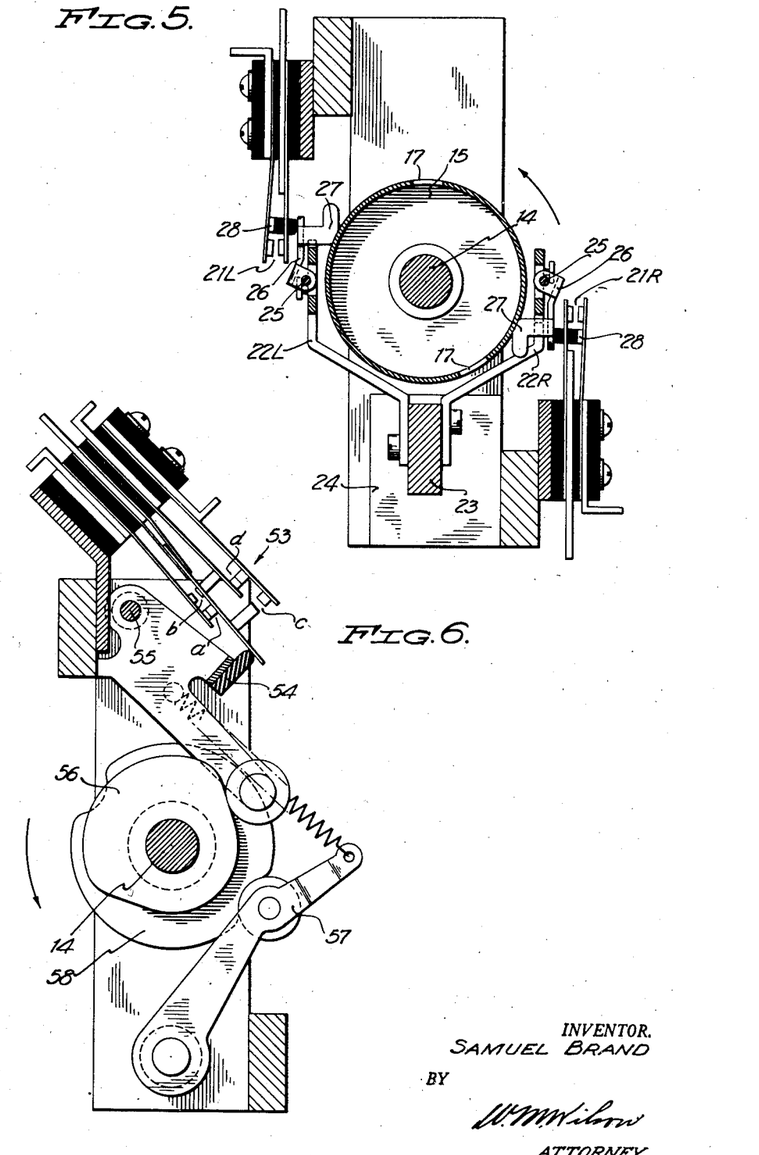
Fig. 5 is a sectional elevation taken on lines 5—5 of Fig. 1 showing the drum operated interposer contacts.
Fig. 6 is a section elevation taken on lines 6—6 of Fig. 1 showing the alternating contacts and their operating mechanism.

Along one side of the drum is located a set of nine pairs of contacts 21R and along the opposite side are located a set of nine pairs of contacts 21L (see Figs. 1 and 5). Located between the drum and each set of contacts is a plate 22L or 22R secured to a rectangular bar 23 mounted in brackets 24 for sliding lengthwise in a direction parallel to shaft 14. Each plate 22L or 22R has secured thereto a rod 25 and upon each rod are pivoted nine interposer levers 26, each with a finger 27 riding on the surface of drum 15. Each finger 27 is urged against the drum by pressure of a related contact spring and, when the plate and interposers are shifted to the left or right as viewed in Fig. 1, the contacting pin 28 (Fig. 5) slides on the interposer and maintains pressure against it.

When during the rotation of the drum a perforation 17 in line wtih finger 27 reaches such finger, the latter will be pressed into the perforation and the related contact 21L or 21R will close.

Before explaining the specific mechanism for shifting the drum 15 and interposer plates 22L and 22R, the principle involved in the selection of controlling perforations on the drum will be explained in connection with the diagram of Fig. 11. In this figure the side of drum 15 containing the right hand partial product digit perforations 17 is shown. The manner of arranging the perforations is the same as disclosed in the above mentioned application and briefly the perforations are grouped in nine sets, one set for each possible multiplier digit. Each set is divided into nine parallel positions indicated by lines 30 numbered 1 to 9 and the perforations are also spaced on nine horizontal lines 31 numbered 1 to 9. Finger 27, of which there is one for each set of perforations, normally rides along the 5 line 30 so that with the drum 15 and interposers 26 in the normal position shown the parts are set to multiply by the digit 5; that is, as drum 15 now rotates, fingers 27 will drop into perforations representing the right hand digits of 5 times all of the digits 1 to 9. For example, the left hand finger 27 will drop into the perforation at the intersection of the 5 line 30 and the 5 line 31 in the 1 set, and close its contacts 21R at such time to represent the digit 5 of the product 1 times 5; the right hand finger 27 will drop into the perforation at the intersection of the 5 line 30 and the 5 line 31 in the 9 set and close its contacts 21R at such time to represent the 5 of the product 9 times 5; and similarly in the other odd numbered sets the related contacts 21R will close when the perforations on the 5 line 31 reach the fingers. In the even numbered sets there is no perforation on the 5 line 31, since the right hand digit is zero.

To select the other lines 30, drum 15 may be shifted to the left or right a distance equal to the spacing between adjacent lines 30 as indicated by arrows 32, and interposers 26 may be shifted to the left or right a distance equal to three times the spacing between adjacent lines 30 as indicated by arrows 33. The following table will show the combinations of shift for the drum and interposer to position fingers 27 in line with the other lines 30.

| Drum 15 | Interposers 26 | Select line 30 |
|---|---|---|
| Shift left | | 6 |
| Shift right | | 4 |
| | Shift left | 2 |
| | Shift right | 8 |
| Shift left | Shift left | 3 |
| Do | Shift right | 9 |
| Shift right | Shift left | 1 |
| Do | Shift right | 7 |

Thus, with a maximum movement of one step by the drum and three steps by the interposers (a step being the spacing of columns 30), selection is effected for any of the multiplier digits, except 5, and for such 5 digit no movement is required. The left hand partial products perforations are also arranged along lines 30 and lines similar to 31 in accordance with the left hand components, so that shifting of drum 15 and interposer plate 22L will select the appropriate lines of perforations.

Shifting the drum

Secured to the left end of drum 15 (Fig. 7) are two disks 35L and 35R provided with camming surfaces 36 (see also Fig. 3). With the drum in normal central position along shaft 14, these camming surfaces are in line with interposers 37 (Fig. 7) under which they normally pass. The lower ends of these interposers are beveled so that, when either is lowered into the path of the related cam 36, the latter will be engaged during its rotation to cam itself and the drum along shaft 14 to the left or right, depending upon which of the two interposers 37 is lowered.

Each interposer 37 is notched to receive the free end of an armature 38 pivoted at 39, and these armatures are controlled by magnets 40L and 40R. A T lever 41 similar to that shown in Fig. 4 biased by spring 42 in the position shown engages both armatures 38 to normally hold them in their upper or inactive positions. A restoring bail 43 also pivoted at 39 passes under the armatures and is secured to a lever 44 lying in the path of restoring rods 19.

As viewed in Fig. 3, drum 15 rotates counterclockwise and, just before camming surfaces 36 arrive at interposer 37, the latter may be operated so that, if one or the other is lowered into the path of a camming element 36, the drum will shift itself in one direction or the other. Restoring cam surfaces 45 (Fig. 7) fixedly secured to the framework are located to engage surfaces 36 as the latter pass by, so that the drum is centralized in its normal position as surfaces 36 approach interposers 37.

Figures 7, 8, 9:
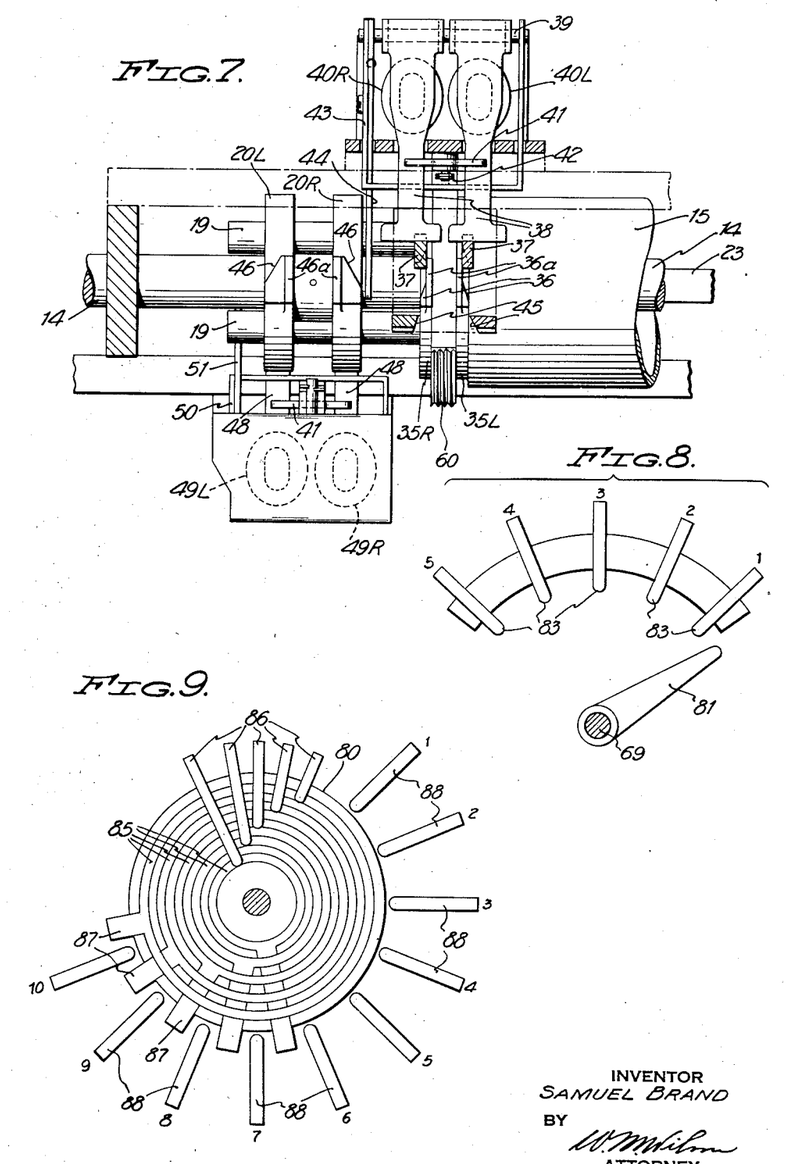
Fig. 7 is a plan elevation looking in the direction of arrows 7—7 of Fig. 1.
Fig. 8 is a diagrammatic showing of certain column shift contacts.
Fig. 9 is a diagrammatic showing of certain other column shift contacts.

Cams 36 have extensions 36a spaced to pass between interposers 37 so that, if neither interposer is lowered, cams 36 will pass beneath them and extensions 36a pass inside the interposers and serve to maintain the drum in central position and against accidental displacement during this part of the rotative movement.

*Shifting the contact interposer plates*

Referring to Fig. 2, disks 20L and 20R are provided with camming surfaces 46 which engage vertically slidable interposers 47 and restoring cams 48 during the rotation of shaft 14. The action is the same as described for the shifting of drum 15 and in the same manner interposers 47 are operated by armatures 48 of a pair of magnets 49L and 49R (Fig. 7). The restoring bail 50 has its connected arm 51 in the path of rods 19 as shown in Fig. 7.

In this case the disks, being secured to shaft 14, remain in their planes of rotation and, when an interposer 47 is elevated, the interposer when engaged by cam 46 will be shifted laterally and will carry with it the sliding bar 23 upon which the contact interposer plates 22L and 22R are secured. If neither interposer 47 is elevated, extensions 46a pass between interposer 47 to keep bar 23 centralized. The cams 48 are fast to bar 23 so that cam 46 engages them and restores bar 23 if it had been previously shifted.

It will be noted that two sets of diametrically opposite cams 36 and 46 are provided so that drum and interposer plate restoration occurs at 180° intervals and, assuming the parts are relatively shifted in accordance with a first multiplier digit, contacts 21R (Fig. 5) will read the perforations in one half of drum 15 and contacts 21L will read the perforations in the other half during the first 180°. Thereafter, the parts are restored and reshifted in accordance with the next multiplier digit, and during the second 180° contacts 21L will read the perforations in the first half of the drum and contacts 21R will read the perforations in the second half. There is thus an alternation in the operation of the two sets of contacts 21L and 21R, each set recording right and left partial product digits alternately.

To direct the circuits through these sets of contacts, there is provided a set of so-called alternating contacts generally designated 53 (Figs. 1 and 6) comprising separate pairs of contacts designated $a$, $b$, $c$ and $d$. A bail 54 pivoted at 55 is rocked by a cam 56 on shaft 14, so that the contacts remain in the position shown during the reading portion of one of the half revolutions and take an alternate position (that is, contacts $b$ and $c$ close and $a$ and $d$ open) during the reading portion of the next half revolution. The circuits controlled by these contacts will be explained in connection with the description of the circuit diagram. A spring urged detenting follower 57 and notched disks 58 are provided to hold shaft 14 in position when at rest.

Referring to Figs. 1 and 3, bar 23 has a notched block 59 secured thereto and drum 15 has a series of circumferential teeth 60 extending part way around a circle. The teeth 60 are of such extent that immediately after displacement of the drum 15 and bar 23 has been effected by their respective camming interposers, teeth 60 will engage in notches in block 59 to lock the drum and bar together in shifted relationship, so that during the reading part of the rotation, this relationship cannot be disturbed.

*Column shift mechanism*

Figure 10:
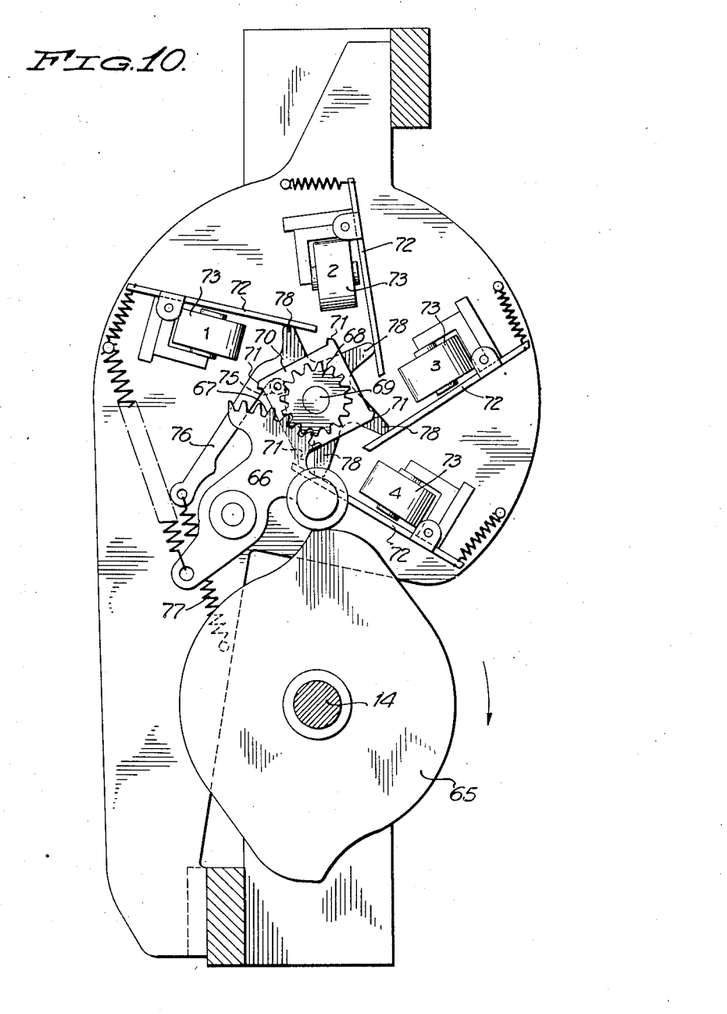
Fig. 10 is an elevational view of the column shift positioning mechanism looking in the direction of lines 10—10 of Fig. 1.

Referring to Figs. 1 and 10, shaft 14 has secured thereto a cam 65 rotating in the direction indicated, which rocks a spring urged follower lever 66 during the rotation of the shaft. Rack teeth 67 on follower 66 mesh with a gear 68 to oscillate a rod 69 to which there is secured a member 70 having four stopping teeth 71. Spaced around member 70 are four armatures 72, each with an actuating magnet 73, which are designated 1, 2, 3 and 4. The space relationship is such that as cam 65 rotates from the position shown and gear 68 and member 70 rock counterclockwise, energization of the 1 magnet 73 will rock its armature 72 into the path of a tooth 71 to stop member 70 after what may be called one step of advance. Energization of the 2 magnet 73 will intercept a tooth after two steps, energization of the 3 magnet 73 will intercept a tooth after three steps, and energization of the 4 magnet 73 will intercept a tooth after four steps. Thus, by selectively energizing the magnets 73, member 70 and rod 69 may be differentially positioned.

If none of the magnets 73 is energized, member 70 and rod 69 advance one step further to a fifth position. Thus, the shaft may be set in any of five positions each differently spaced from the home or restored position shown in Fig. 10. A pin 75 carried by member 70 engages a member 76 loose on rod 69 to rock the same clockwise against action of spring 77 whereupon fingers 78 will engage and restore the several armatures 72.

Referring to Fig. 9, one end of rod 69 has fastened thereon a wiper 81 which engages any one of fixed segments 83 designated 1 to 5, depending upon the position in which rod 69 is differentially set. The wiper 81 and segments 83 are diagrammatically shown in the circuit diagram (Fig. 13) and their purpose will be explained later in the description of such circuit diagram.

A commutator 80 secured to rod 69 has five arcuate inserts 85 moulded therein, each of which contacts a wiper 86. Each insert 85 is in engagement with its related wiper 86 when the commutator 80 is in any of its five positions. Each insert 85 has a tab 87 all of which lie in a common plane and spaced as shown in Fig. 9 to cooperate with a ring of wipers 88 which are numbered 1 to 10. When commutator 80 is in its first set position, the five tabs 87 contact the five wipers 88 designated 10 to 6 to electrically connect these five wipers to the five wipers 86. When commutator 80 is in its second set position, the five tabs 87 contact the five wipers 88 designated 9 to 5 and so on until in the fifth position the five tabs 87 contact the five wipers 88 designated 6 to 2. There are two commutators 80 provided, one for the LH components and one for the RH components with the tabs 87 of the latter displaced one step to the right as represented in Fig. 13a.

In the circuit diagram (Fig. 13a), the tabs 87 and wipers 88 are represented diagrammatically as arrows with those designated 87 shiftable to the right. Two separate sets are shown, one for the LH readout device and one for the RH readout device, with connections 90 made from wipers 88 to totalizer magnets 13 as shown.

*Circuit diagram*

Figure 12:
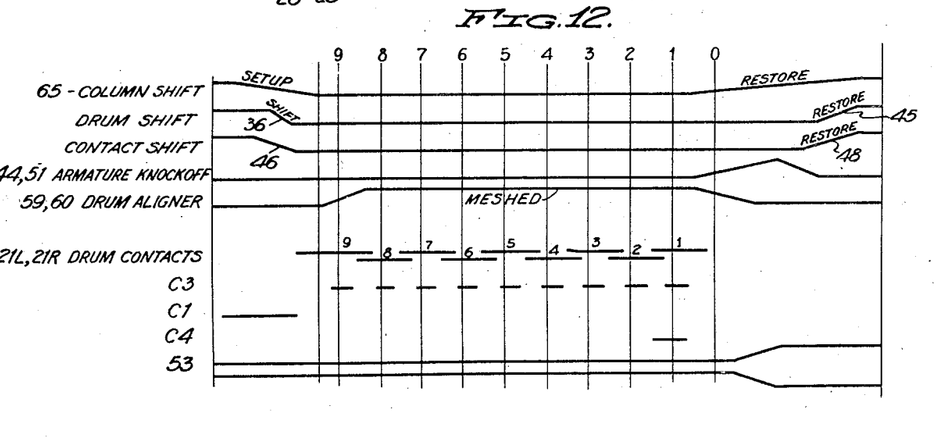
Fig. 12 is a timing diagram of the parts of the apparatus.

The manner in which the several mechanisms described hereinabove are coordinated to effect multiplication of two factors will now be explained in connection with the wiring diagram (Figs. 13 and 13a) and the timing diagram (Fig. 12). As a preliminary, a multiplier such as 40068 is set up on the multiplier readout device as explained and a multiplicand 7283 is set up on the multiplicand readout device.

As is usual in electrical multiplying machines, a so-called column skip device is provided to control operations so that the mechanism effects a cycle of operations only for each significant digit in the multiplier. Such device comprises a set of so-called column skip relays R1 to R5 (Fig. 13), each of which controls contacts designated R1a, R1b, R1c. As a preliminary, there is a test made to ascertain which multiplier order contains zero settings and this test is effected manually (for purposes of simplicity in the disclosure) by momentarily pressing a key 92 to close a series of contacts 92a. With current supplied to main lines 93 and 94, circuits are traceable for the multiplier chosen from line 93, left hand contacts 92a, the row of 0 segments 11, brushes 12 in the thousands and hundreds orders (where they are set at 0), common strips 10, contacts 92a in these orders, relays R2 and R3, and wire 95 to line 94. Relays R3 and R4 close their contacts R3a and R4a to establish holding circuits through switch 96 and these relays will accordingly remain energized throughout subsequent operations.

Main shaft 14 is now given a half revolution during the beginning of which (see Fig. 12) a suitable cam closes a pair of contacts designated C1. These contacts (Fig. 13) complete a circuit from line 93, contacts C1, lower contacts R1b, wire 97, common 10 in the tens of thousands order, brush 12 in the 4 position, 4 row of segments 11, magnet 40R to line 94. Energization of magnet 40R as explained will cause the drum 15 to shift one step to the right (Fig. 11), so that the fingers 27 traverse the 4 lines 30, in which the partial product perforations for the multiplier digit 4 occur.

A concurrent circuit is traceable from line 93, through contacts C1, lower contacts R1c, the 1 column shift magnet 73 and wire 98 to line 94. These circuits are held for the duration of closure of contacts C1 as indicated in Fig. 12, and as indicated the column shift cam is moving to enable rotation of member 70 (Fig. 10) which will accordingly be interrupted at its first stopping position to bring wiper 81 into engagement with the left hand wiper 83 (Fig. 13) and will also shift tabs 87 (Fig. 13a) to contact the five left hand wipers 88 of LH and the 9 to 5 wipers of RH. With magnet 40R energized, the drum shift cam 36 (Fig. 7) engages the lowered interposer 37 at the time indicated by the line in Fig. 12, so that shifting occurs at such time and upon completion of the shift the drum aligner functions as indicated on line 59, 60 to lock the drum 15 and contact shifting bar 23 together.

As drum 15 now continues to rotate, the fingers 27 drop into the perforations at times depending upon the partial product digits for the number 4. While the fingers are in the openings and the related contacts 21L and 21R are closed, a cam on shaft 14 repeatedly closes a pair of contacts C3 timed with the totalizer operation.

Figure 14:
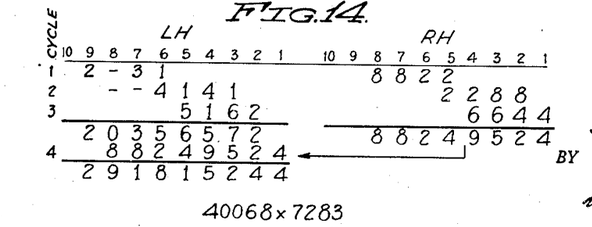
Fig. 14 is a diagram showing the steps involved in a typical multiplying example.

Referring to Fig. 13a, the contacts 21L close for the example chosen at times corresponding to the left hand digit values 2, 3 and 1, and the contacts 21R close at times corresponding to the digit values 8 and 2 (see Fig. 14). When contacts C3 close at the 8 time, a circuit is traceable from line 93 (Fig. 13a), contacts C3, the 7 contacts 21R, a contacts 53, brush 12 (set at 7), common 10, wiper 87, 8 wiper 88, and connection 90 to the totalizer magnet 13 numbered 8 in the RH totalizer. Concurrently, a circuit is completed from contacts C3, through the 2 contacts 21R, a contacts 53, the brush 12 set at 2 to energize the 7 magnet 13 and enter an 8 in the related order.

At the 3 time, a circuit is traceable from contacts C3, through the 8 contacts 21L, the d contacts 53, 12 brush set at 8 to energize the 7 magnet 13 of the LH set to enter a 3 in this order. At the 2 time three similar circuits pass in parallel through the 7 contacts 21L, the 8 contacts 21R and the 3 contacts 21R to enter 2's in the 9 position of totalizer LH and the 6 and 5 positions of the RH totalizer. Finally, at the 1 time a circuit goes through the 3 contacts 21L to energize the 6 magnet LH to enter a 1 in this order. In this manner under control of contacts C3 and the perforations in drum 15, the partial products of 4 times 7283 are entered into the LH and RH totalizers as indicated in the example of Fig. 14.

Thereafter, as seen from Fig. 12, the column shift device restores, the drum aligner disengages, and the armatures 44, 51 of magnets 40 and 49 are also restored. After this, the drum 15 and interposer plates 22 are returned to their central positions as at the beginning of operations. Also, the set of alternating contacts 53 is shifted to connect the LH multiplicand readout to the RH totalizer and the RH multiplicand readout to the LH totalizer, since during the next half revolution of drum 15 the fingers 22R read the left hand components and the fingers 22L read the right hand components. In the latter part of the half revolution before the column shift restores, cam contacts C4 (Fig. 13) close and a circuit is then traceable from line 93, contacts C4, wiper 81, the left hand wiper 83, relay R1, wire 95 to line 94. Relay R1 is thus picked up and held through its contacts R1a.

At the beginning of the second half revolution, the relays R1, R2 and R3 are in energized condition so that, when contacts C1 now close, the 4 column shift magnet will be energized through a circuit traceable from line 93, contacts C1, upper contacts R1c, R2c, R3c, lower contacts R4c and 4 magnet 73, wire 98 to line 94. As a result, column shift takes place to move wiper 81 into its 4 position where it contacts the wiper 83 fourth from the left, and the tabs 87 (Fig 9) shift the same amount.

The drum 15 is now to shift for multiplication by the digit 6 and this is effected as follows: closure of contacts C1 completes a circuit from line 93, contacts C1, upper contacts R1b, R2b, R3b, lower contacts R4b, wire 97, brush 12 set at 6, magnet 40L to line 94. As explained, energization of magnet 40L will cause shifting of drum 15 to the left one step to select the 6 lines 30 (Fig. 11) for action.

Now when the perforations in the drum pass the interposer fingers 27, partial product circuits will be completed to enter the digital values indicated along line 2 of Fig. 14 to represent the components of 6 times 7283 in the appropriate totalizer orders. It will be noted in Fig. 13a that the contacts 21L are now connected to the RH multiplicand device through the b contacts 53, and the contacts 21R are now connected to the LH multiplicand device through the c contacts 53.

Again, during the latter part of this operation, contacts C4 close to energize relay R4 and the alternating contacts shift back to their initial position, so that during the third half revolution the contacts 21L control the LH totalizer and the contacts 21R control the RH totalizer, as in the first half revolution. When contacts C1 close in the third half revolution, no column shift magnet is energized and as a result the wiper 81 and tabs 87 advance to their extreme or fifth positions for entering the components as indicated on line 3 of Fig. 14, and at the end of this half revolution when contacts C4 close to pick up relay R5 such operation may serve as an indication that entry of all partial products is completed, and no further half revolutions are to be performed.

Figure 11:
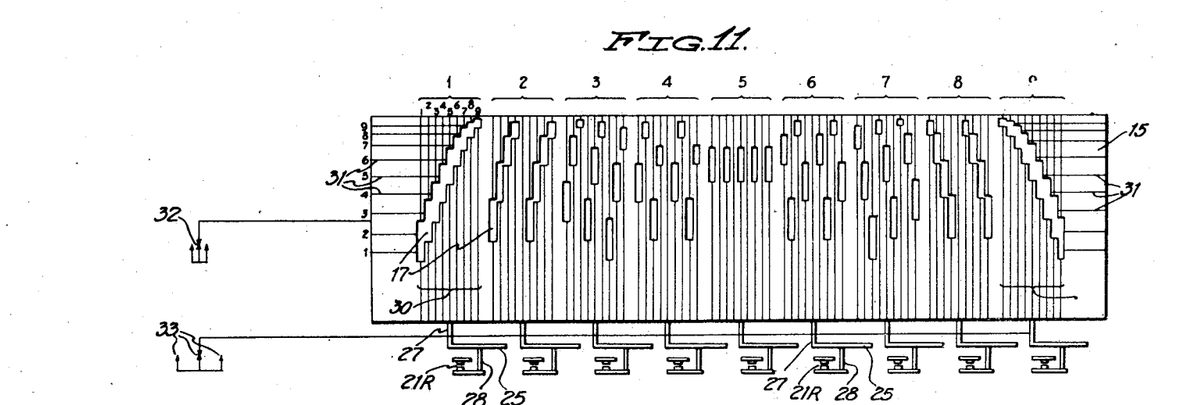
Fig. 11 is a diagram showing the shifting relationship between the drum and interposers.

At the beginning of the third half revolution, when contacts C1 closed a circuit was completed from line 93, contacts C1, upper contacts R1b, R2b, R3b and R4b, lower contacts R5b, wire 97 to the brush 12 set at 8 from which the circuit continued to magnet 49R to shift the interposer plate to the right to select the 8 line of perforations (Fig. 11).

In Fig. 13, a pair of relays R10 and R11 are provided with contacts a, b, c and d for the purpose of preventing back circuits when there is to be a double shift, that is, a shift of both the drum and contacts. Thus, for the digit 9, it is seen that relay R10 is energized and its contacts a and b close parallel circuits to energize magnets 40L and 49L. For digit 7, relay R11 is energized and its contacts a and b close parallel circuits to energize magnets 40R and 49R. For digit 5, no magnets 40 or 49 are energized, since the interposer fingers are normally on the 5 line 30. For the digit 3, relay R11 is energized and its contacts c and d close parallel circuits to energize magnets 40L and 49L. For the digit 2, relay 49L is energized directly, for the digit 1 relay R10 is energized and its contacts c and d close parallel circuits to energize magnets 40R and 49L.

Thus, for each significant multiplier digit the proper magnets 40 and/or 49 or neither is energized to effect the appropriate line of partial product perforations. For diagrammatic purposes, relays R1 to R5 are shown as having contacts R1d to R5d, which are all closed when selection of partial products has been completed for all orders of the multiplier and, when all are closed, they complete a circuit to a lamp 100 which serves to signal the end of partial product selecting and entering operations and further rotation of shaft 14 is interrupted. Switch 96 may now be opened to break the holding circuits for relays R1 to R5 and the apparatus is in readiness to repeat the operations explained with the same or a new set of factors.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a cyclically operable multiplying machine, having a drum containing configurations representing partial product values for all possible multiplier and multiplicand digit factors, said drum being positionable along its axis in either direction from a normal position, a device for positioning the drum, means for rotating the drum, a set of digit representing sensing elements cooperable with the configurations of the drum during its rotation, said set of elements being positionable in either direction along a line parallel to the axis of the drum from a normal position, a device for positioning the set of sensing elements, a device settable to represent a multiplier digit, and means controlled by said settable device for selectively operating said drum and sensing element positioning devices to cause moving of either the drum or the set of sensing elements or both each in either direction to bring certain of the configurations in cooperative relationship with the set of sensing elements in accordance with a represented multiplier digit.

2. The invention set forth in claim 1 in which positive locking means directly connecting the drum and set of elements together is provided and rendered effective during a period in the rotation of the drum after the drum and set of elements have been positioned for positively locking the drum and set of elements against relative axial displacement during said period.

3. The invention set forth in claim 1 in which the drum and set of elements are each positionable a single step in either direction from a normal central position and the movement of the set of elements is three times the extent of movement of the drum, whereby the drum and set of elements are relatively displaceable to cause each sensing element to take four positions along the surface of the drum to one side or another of a central position.

4. The invention set forth in claim 1 in which the moving means comprises two pairs of cam guides, one for the drum and one for the elements, means for selectively actuating one guide of either or both pairs, a pair of opposite cam surfaces integral with the drum, one of said surfaces being engageable with an actuated slide of one pair to cam the drums axially to a selected position, a second pair of opposite cam surfaces integral with the drum, one of said second surfaces being engageable with an actuated slide of the second pair to cam the slide in the direction of the axis of the drum and carry with it said set of elements to a selected position.

5. In a cyclically operable multiplying machine having a rotatable drum containing configurations representing partial product values for all possible multiplier and multiplicand digit factors, a set of sensing elements and contacts controlled thereby arranged along one side of the drum, a second set arranged along the opposite side of the drum, the drum having the left hand component configurations on one half thereof and the right hand component configurations on the other half thereof whereby, as the drum rotates, one set of contacts will be actuated according to left hand components and the other actuated according to right hand components during a half revolution of the drum and during the next half revolution of the drum the actuation will be reversed, a pair of totalizers, one for receiving left hand components and the other for receiving right hand components, connections between said sets of contacts and said totalizers and including switching devices operable so that each totalizer will be connected to alternate sets of contacts as alternate halves of the drum are sensed.

6. In a cyclically operable multiplying machine, totalizer means, a member containing configurations representing partial products for all possible multiplier and multiplicand digit factors, said member being continuously movable in one direction and positionable in a transverse direction from a normal position to positions on opposite sides of said normal position, a set of digit representing elements arranged in a line, means for moving said member in a direction transverse to said line of elements whereby said elements are cooperable with the configurations of the member for effecting partial product entries into said totalizer means, a device settable to represent a multiplier digit, means controlled by said settable device for moving said member in a direction parallel to said line of elements, and further means controlled by said settable device for moving said elements in the direction of their line from a normal position to positions on opposite sides of said normal position, whereby the joint movement of the member and elements will select a certain part of the configurations for control of said elements during the movement of the member in the transverse direction in accordance with a represented multiplier digit.

7. In a cyclically operable multiplying machine, a drum containing configurations representing partial product components, arranged in nine equally spaced circles around the drum, a sensing element normally positioned in line with the central circle of configurations, means for shifting the drum axially one space in either direction to align the element with either of the circles adjacent the central circle, means for shifting the element a distance equal to three spaces in the direction of the axis of the drum and in either direction to align the element with either of the circles adjacent the outer circles, and means for selectively operating both said shifting means, whereby the element will be aligned with any one of said nine circles of configurations.

SAMUEL BRAND.